(12) United States Patent
Kim et al.

(10) Patent No.: US 6,519,959 B2
(45) Date of Patent: Feb. 18, 2003

(54) AIR CONDITIONER

(75) Inventors: Houng Joong Kim, Hitachi (JP); Yasuo Notohara, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/974,872

(22) Filed: Oct. 12, 2001

(65) Prior Publication Data

US 2002/0116941 A1 Aug. 29, 2002

(30) Foreign Application Priority Data

Feb. 28, 2001 (JP) ........................ 2001-053429

(51) Int. Cl.[7] .............................. F25B 1/00; F25B 41/00
(52) U.S. Cl. ........................................ 62/211; 62/228.4

(58) Field of Search ................................ 62/211, 228.4; 310/156.37, 156.18, 156.24, 156.01, 12, 49 R, 112, 114

(56) References Cited

U.S. PATENT DOCUMENTS

| | | | | |
|---|---|---|---|---|
| 4,739,201 A | * | 4/1988 | Brigham et al. | 310/49 R |
| 5,281,879 A | * | 1/1994 | Satake et al. | 310/114 |
| 5,821,710 A | * | 10/1998 | Masuzawa et al. | 318/254 |

* cited by examiner

Primary Examiner—Denise L. Esquivel
Assistant Examiner—Marc Norman
(74) Attorney, Agent, or Firm—Crowell & Moring, LLP

(57) ABSTRACT

An air conditioner having a permanent magnet electric motor with a high output power characteristic in a cooling and heating range and a high output characteristic even in defrosting operation in a high-speed range.

14 Claims, 14 Drawing Sheets

DURING HEATING OPERATION

DURING COOLING, DEHUMIDIFYING, DEFROSTING OPERATIONS

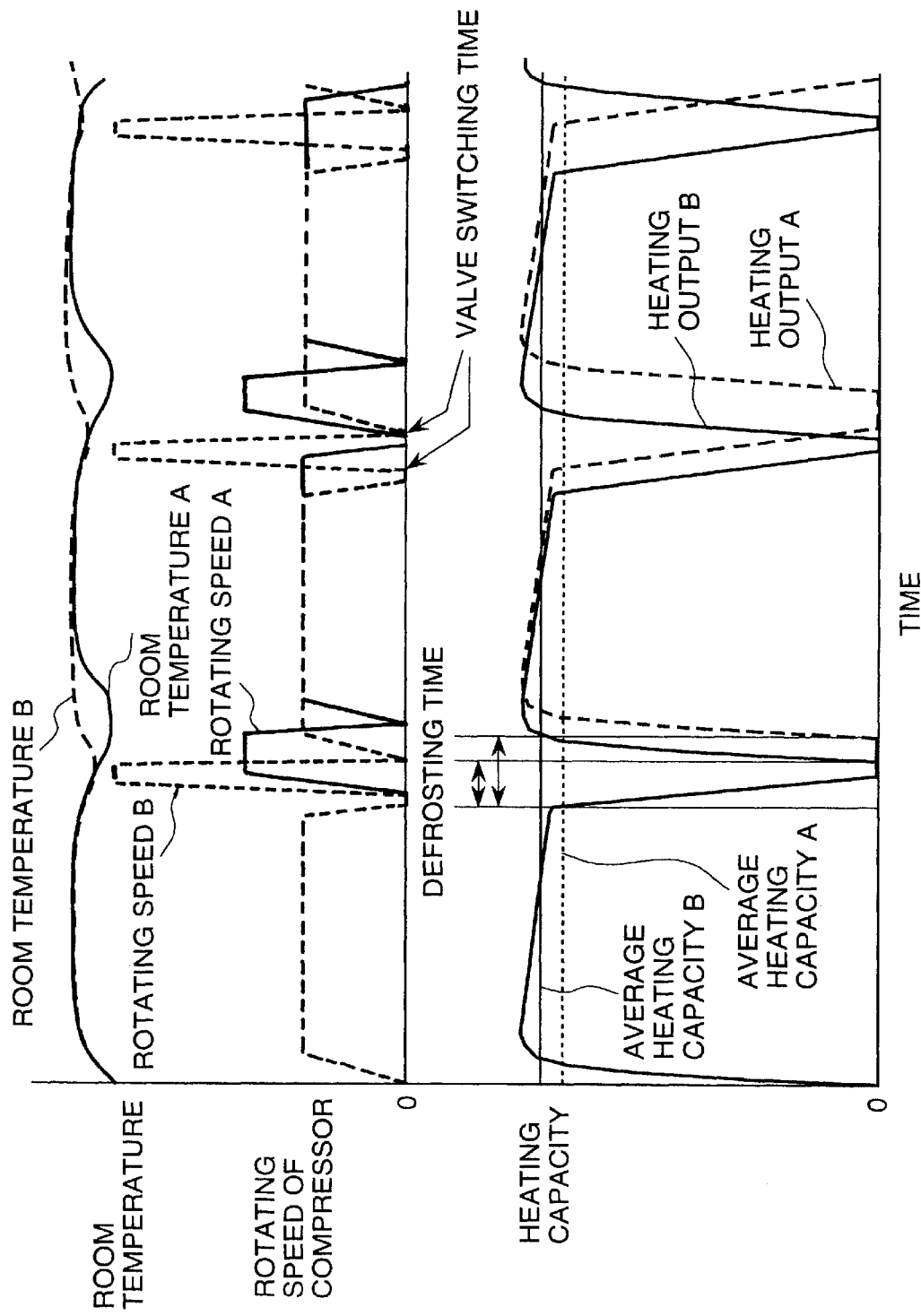

AIR CONDITIONER

BACKGROUND OF THE INVENTION

The present invention relates to an electric motor using permanent magnets for the magnetic field, and particularly to an electric motor for driving an air conditioner and to a method of controlling the motor, and to an electric motor in which a rotor of the electric motor is comprised of a first field magnet and a second field magnet, positions of the magnetic pole centers of the first field magnet and the second field magnet being varied according to a direction of torque, effective magnetic flux density being capable of being changed according to the rotating speed, and to a method of controlling the electric motor.

In a permanent magnet field type electric motor of the prior art, an induced electromotive force E is determined by a constant magnetic flux $\Phi$ generated by a permanent magnet arranged in a rotor and a rotating angular speed $\omega$ of the motor. That is, when the rotating angular speed $\omega$ (rotating speed) of the motor is increased, the induced electromotive force is proportionally increased.

Accordingly, high torque can be obtained in a low speed range, but operation in a high-speed range is difficult because the variable range of rotating speed is narrow. Therefore, it may be considered that the high-speed operation range is widened using a field weakening control technology.

Further, in an air conditioner, defrosting operation is periodically performed during heating operation. However, there is a problem in that heating capability is lowered when the defrosting operation time is long.

The method of widening the high speed operation range using the field weakening control technology described above has limitations of heat generation and efficiency decrease due to weakening field current.

Further, it is preferable that the defrosting operation during heating operation is performed at a high speed operation because the load of defrosting operation is low, but there is a limitation in the field weakening control due to the increase in the induced electromotive force of the permanent magnet.

SUMMARY OF THE INVENTION

An object of the present invention is to provide an air conditioner comprising a permanent magnet electric motor which has a high output power characteristic in a cooling and heating range and a high output characteristic even in defrosting operation in a high-speed range.

In the present invention, an air conditioner comprising a refrigerating cycle composed of at least a compressor; an electric motor to be used as a power source of the compressor; an electric driving circuit (an inverter) for driving the electric motor; an in-room heat exchanger; an electrically operated expansion valve; and an out-room heat exchanger, a flow rate of a refrigerant circulating in the refrigerating cycle being controlled by changing rotating speed of the electric motor and an opening degree of the electrically operated expansion valve, wherein The electric motor comprises a stator having a primary winding and a rotor having a field magnet, the field magnet comprising a first field magnet having different polarity magnetic poles sequentially arranged in a rotating direction and a second field magnet having different polarity magnetic poles sequentially arranged in a rotating direction, the second field magnet being capable of rotating relative to the first field magnet, the first and the second field magnets being opposite to magnetic poles of the stator; and a mechanism for changing a phase of a composite magnetic pole of the first and the second field magnets with respect to the magnetic pole of the first field magnet depending on a direction of torque, the mechanism for changing depending on a direction of torque comprising means for making magnetic pole centers of equal-polarity of the first and the second field magnets in phase by a direction of torque generated in the rotor and by balance of magnetic action forces between the first and the second field magnets; and means for making the magnetic pole centers of the first and the second field magnets out of phase when the direction of torque generated in the rotor is reversed.

BRIEF DESCRIPTION OF DRAWINGS

FIG. 2 is a chart showing the characteristics of an air conditioner during heating operation.

DESCRIPTION OF THE CURRENTLY PREFERRED EMBODIMENTS

Figure 1A:
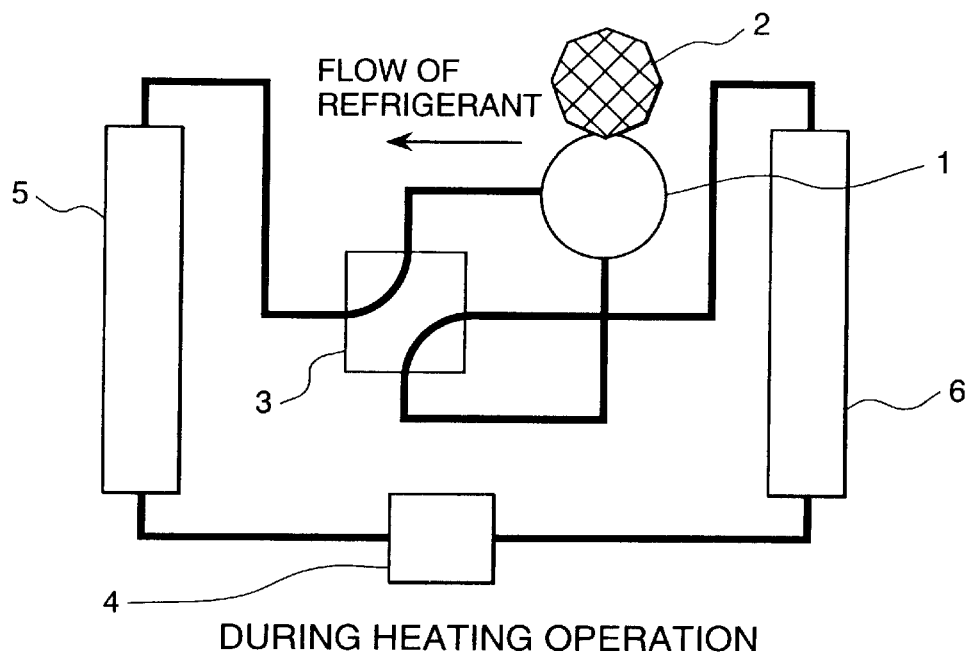
FIGS. 1(a) and 1(b) are schematic diagrams showing a refrigerating cycle having an embodiment of a permanent magnet type synchronous motor during the heating operation and during other operations, respectively.
Figure 1B:
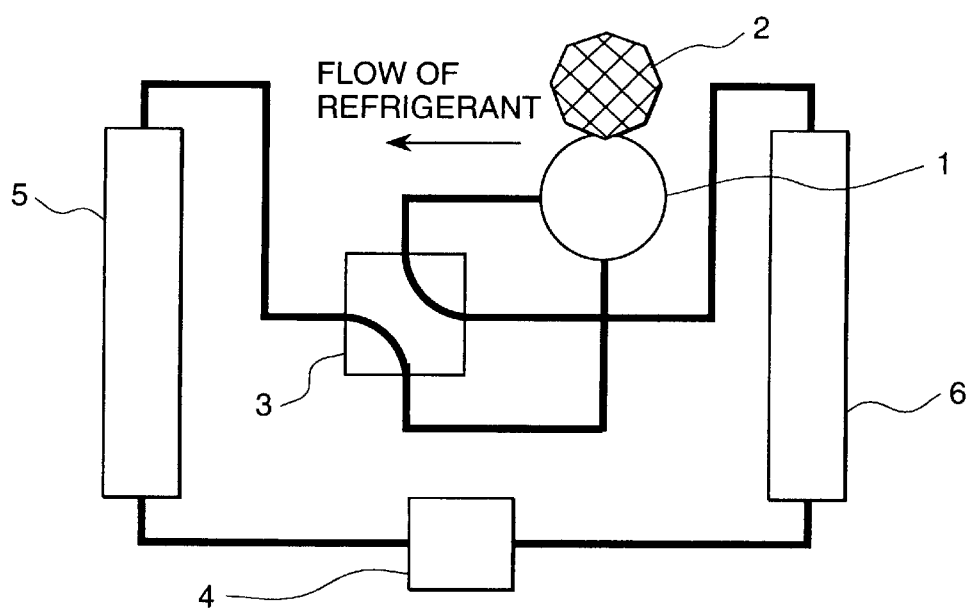

FIG. 1(a) shows the refrigerating cycle (flow of refrigerant) during heating operation, and FIG. 1(b) shows the refrigerating cycle during cooling, dehumidifying and defrosting operations.

The air conditioner shown in FIG. 1 has a basic structure of the refrigerating cycle composed of a compressor 1, an electric motor 2 of power source of the compressor, a four-way valve 3, an expansion valve 4, a in-room heat exchanger 5 and an out-room heat exchanger 6 in which the flow rate of refrigerant circulating in the refrigerating cycle is controlled by varying the rotation speed of the electric motor and the opening degree of the electrically-operated expansion valve.

Initially, the refrigerating cycle during heating operation shown in FIG. 1(a) will be described.

(1) The high temperature and high pressure refrigerant compressed by the compressor 1 passes through the four-way valve 3 to supply heat into a room from the in-room heat exchanger 5.

(2) The cooled refrigerant is rapidly expanded in the expansion valve 4, and absorbs heat outside the room in the out-room heat exchanger 6.

(3) The heat-absorbed refrigerant is compressed by the compressor 1 again.

(4) Since the temperature of the out-room heat exchanger 6 becomes lower than temperature of outside air as the heating operation is continued, the out-room heat exchanger is frosted.

(5) As the out-room heat exchanger is frosted, the heat exchange power is decreased.

(6) Therefore, defrosting operation is performed with an interval (when frosted).

The refrigerating cycle during defrosting operation is as shown in FIG. 1(b).

(7) The defrosting operation is performed by switching the four-way valve 3 to reverse the flow of the refrigerant and by making the high temperature and high pressure refrigerant flow through the out-room heat exchanger 6 to melt the frost.

(8) In the defrosting operation, the refrigerant flows the same path as that during cooling operation.

(9) In this case, the expansion valve 4 is opened to simply circulate the hot refrigerant.

(10) Therefore, the electric motor is operated in a low load and at a high speed during the defrosting operation (Since the refrigerant circulation speed becomes high as the rotating speed is high, the time required for defrosting can be shortened).

FIG. 2 is a chart showing the characteristics of the air conditioner during heating operation.

In the characteristics shown in FIG. 2, time is taken in the abscissa indicates, and the output power (heating output power) and the average heating output power of the air conditioner, the rotating speed of the compressor and the temperature of the room are indicated in the coordinate. The various kinds of characteristics obtained from a conventional electric motor operated at the maximum capacity of the air conditioner are indicated by attaching the letter A, and the various kinds of characteristics obtained from the permanent magnet type synchronous motor in accordance with the present invention are indicated by attaching the letter B.

The heating capacity will be described below.

(1) The heating capacity is increased up to the maximum value at the same time when the compressor is started into operation. After that, the heating capacity is decreased because the out-room heat exchanger is gradually being frosted to decrease the heat exchange power.

(2) After a certain time elapses, defrosting operation is started. At that time, the compressor 1 is once stopped, and the refrigerating cycle (the four-way valve 3, the expansion valve 4) is switched.

(3) In the condition of defrosting operation, the compressor 1 is rotated at a high speed. In the conventional motor, the speed cannot be increased above a certain rotating speed due to a limitation of the terminal voltage. In the present invention, the rotating speed can be increased up to, for example, about twice as high as the conventional maximum rotating speed by changing the position of magnetic pole center of the second field magnet to decrease the effective magnetic flux.

(4) By doing so, the defrosting time can be reduced, and the average heating capacity can be increased, and accordingly the fluctuation in the room temperature can be suppressed small.

The defrosting time is shortened by the further high-speed rotation of the compressor during defrosting operation, and the advantages as the air conditioner are as follows.

(1) Improvement in the heating capacity and improvement of energy saving.

(2) Improvement in the stable control of room temperature, and improvement in amenity.

Figure 3:
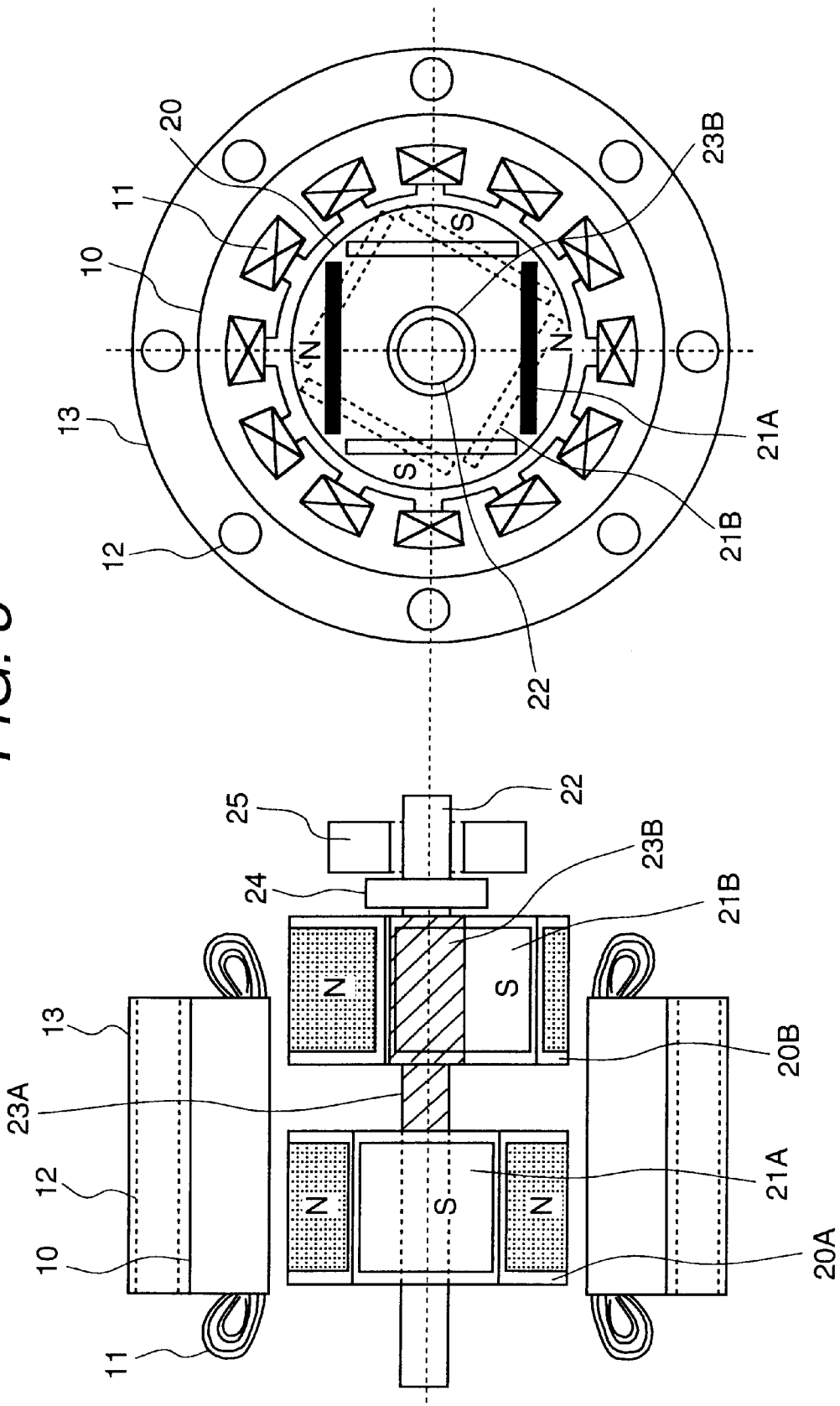
FIG. 3 is a schematic view showing a case (a first case) where magnetic pole centers of equal-polarity of the rotor of the motor in FIGS. 1(a) and 1(b) are out-of phase.

FIG. 3 is a schematic view showing a case where magnetic pole centers of equal-polarity of the rotor of the motor of the power source for the compressor shown in FIG. 1 are out of phase.

In regard to combine the compressor 1 and the electric motor 2 of the driving power source of the compressor 1, there are various types such as a type in which a compressor and an electric motor are combined in a housing, a type in which individual machines of a compressor and an electric motor are coupled with a coupling to transmit driving power and so on. However, the electric motor 2 in the present invention may be of any type.

Referring to FIG. 3, armature windings 11 are wound and set inside slots of a stator core 10, and the stator core 10 is shrink fit into a housing 13 having cooling paths 12 inside of which coolant flows. The fitting method between the stator core 10 and the housing 13 may be press fitting instead of shrink fitting.

The rotor of a permanent magnet embedded type 20 is composed of a first rotor 20A fixed to a shaft 22 and a second rotor 20B separated from the shaft 22. Of course, the rotor may be a rotor of a surface magnet type instead of the rotor of a permanent magnet embedded type.

In the first rotor 20A, permanent magnets 21A are arranged so as to be alternatively aligned magnetic poles of different polarity in the rotating direction. Similarly, in the first rotor 20B, permanent magnets 21B are arranged so as to be alternatively aligned magnetic poles of different polarity in the rotating direction. The field magnets coaxially arranged in the two rotors of the first and the second rotors are opposite to magnetic poles of the stator.

A nut portion 23B is formed in the inner side of the second rotor 20B, and a bolt screw portion 23A to be in contact with the nut portion 23B is formed in the shaft. By connecting the second rotor 20B with the shaft with the screw function, the second rotor 20B is movable in the axial direction while being rotated with respect to the shaft.

Further, a stopper 24 is arranged at a position apart from the side surface of the second rotor 20B so that the second rotor 20B may not exceed a preset displacement from the center of the stator. Furthermore, by providing a servo-mechanism of an actuator 25 for driving the stopper to make the stopper movable in the direction of shaft axis, the displacement between the magnetic pole centers of the first field magnet and the second field magnet can be varied. As the result, it is possible to control the total effective magnetic flux composed of the first field magnet and the second field magnet to the stator having the armature windings in the slits.

Description will be made below on that the effective magnetic flux of the permanent magnets can be varied corresponding to the direction of torque by doing as described above.

In an electric motor basically using armature windings in the stator and permanent magnets in the rotor, in the case that the rotating direction of the rotor is the same between when the motor is working as a motor and when working as a generator, the direction of the torque acting on the rotor becomes opposite between when the motor is working as a motor and when working as a generator.

On the other hand, in the case that the motor is working as a motor, the direction of the torque is reversed when the rotating direction of the rotor is reversed. Similarly, in the case that the motor is working as a generator, the direction of the torque is reversed when the rotating direction of the rotor is reversed.

When the basic theory in regard to the rotating direction and the torque direction described above is applied to the embodiment of the motor in accordance with the present invention, the following can be said.

Figure 4:
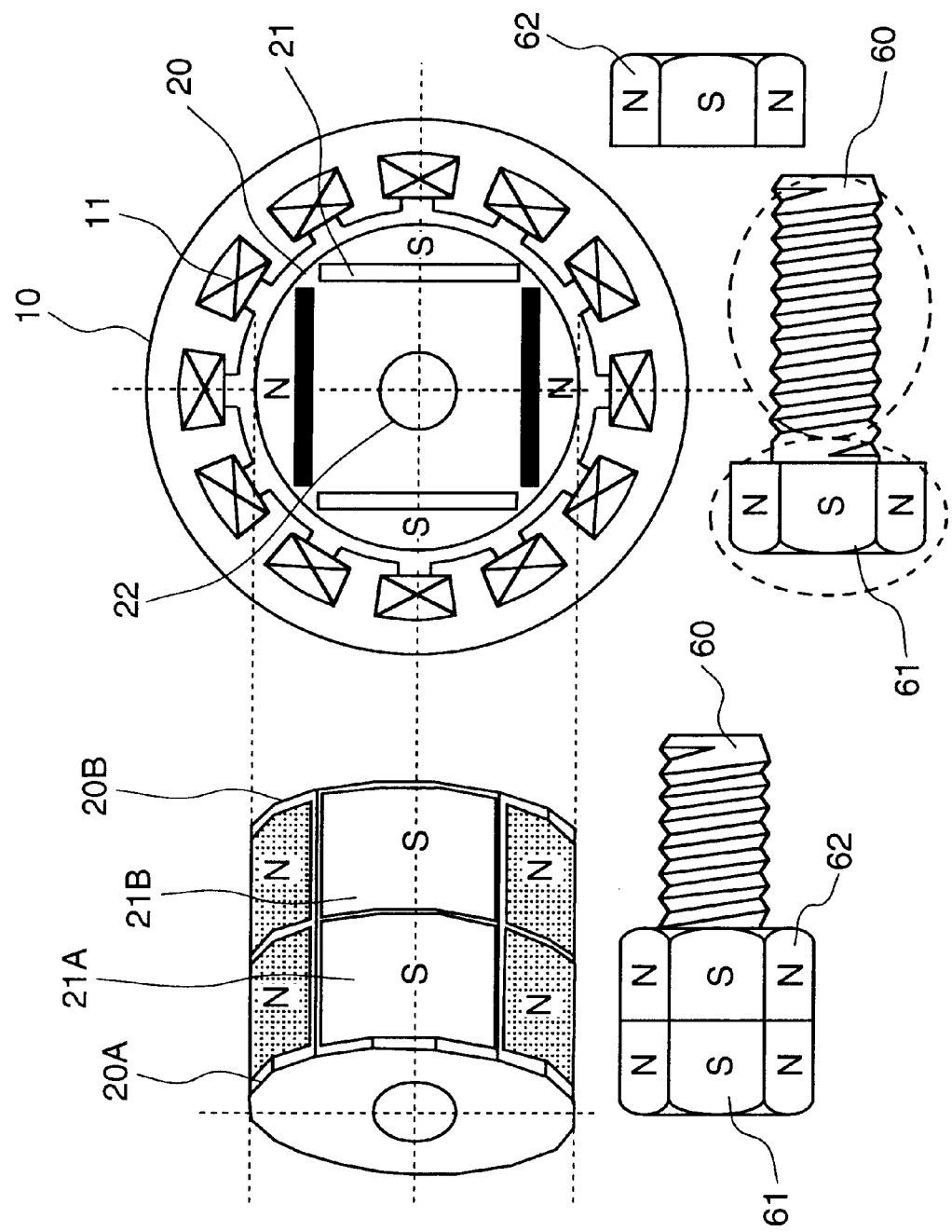
FIG. 4 is a schematic view showing a case where magnetic pole centers of equal-polarity of the rotor of the motor in FIGS. 1(a) and 1(b) are in phase.

When the electric motor is operated in a middle and low rotating speed range of the cooling operation or the heating operation, high torque characteristic can be obtained by making the centers of equal-polarity magnetic poles of the first rotor 20A and the second rotor 20B in phase to increase the effective magnetic flux by the stator magnetic poles and the opposite permanent magnets, as shown in FIG. 4.

Figure 5:
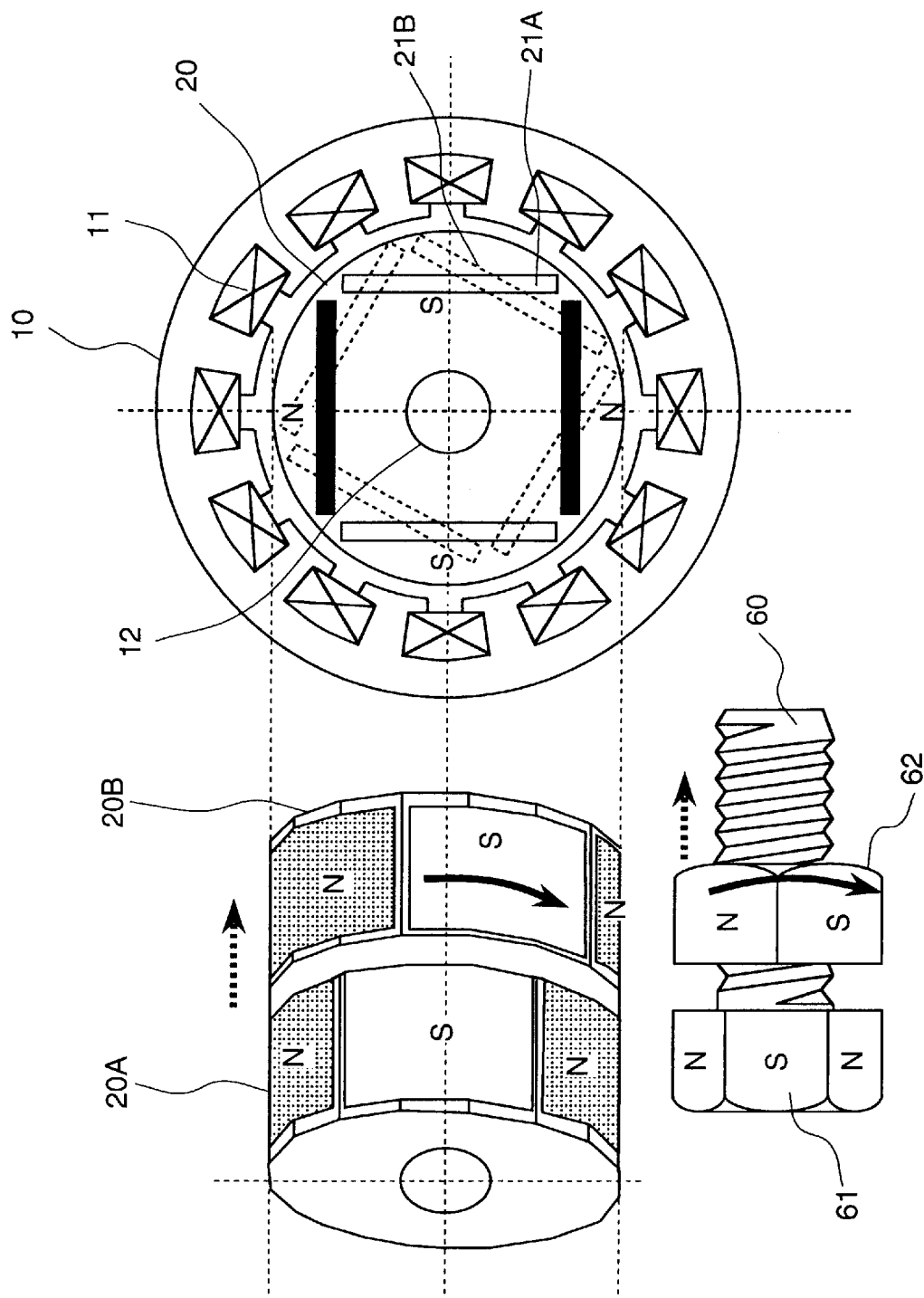
FIG. 5 is a schematic view showing a case (a second case) where magnetic pole centers of equal-polarity of the rotor of the motor in FIGS. 1(a) and 1(b) are out-of phase.

Next, when the electric motor is operated in a high rotating speed range of the defrosting operation, the centers of equal-polarity of the first rotor 20A and the second rotor 20B are brought out of phase while the second rotor 20B is being moved with respect to the shaft 22 to widen the gap between the first rotor 20A and the second rotor 20B as if the nut portion were screwed off from the bolt screw portion, as shown in FIG. 5. Therefore, the effective magnetic flux by the stator magnetic poles and the opposite permanent magnets is decreased. In other words, there is the weakening magnetic field effect, and accordingly a high output power characteristic can be obtained in the high rotating range.

FIG. 5 schematically shows the state that the effective magnetic flux by the stator magnetic poles and the opposite permanent magnets is decreased by making the centers of equal-polarity of the first rotor 20A and the second rotor 20B out of phase while the gap between the first rotor 20A and the second rotor 20B is being widened.

In FIGS. 4 and 5, there are associative illustrations of a head portion 61 of a bolt, a bolt screw portion 60 and a nut portion 62. The head portion 61 of the bolt corresponds to the first rotor 20A, the nut portion 62 corresponds to the second rotor 20B. When the bolt screw portion 60 (corresponding to the part 23A in FIG. 3) is rotating a direction, the nut portion 62 is fastened or unfastened depending on the direction of torque acting on the nut portion 62. The similar phenomenon occurs in the second rotor 20B depending on the direction of torque acting on the rotor.

Description will be made below on operation of the induced electromotive force by the electric motor in accordance with the present invention.

Figure 6A:
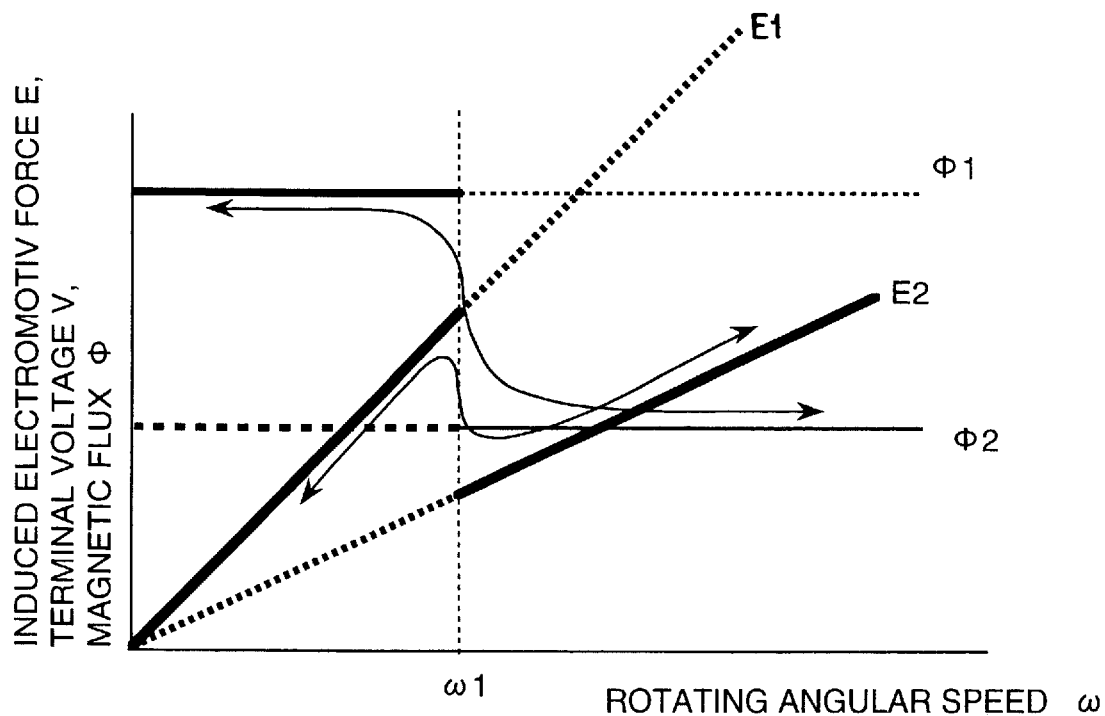
FIGS. 6(a) and 6(b) are graphs showing various kinds of characteristics versus rotating speed of the motor in FIGS. 1(a) and 1(b).
Figure 6B:
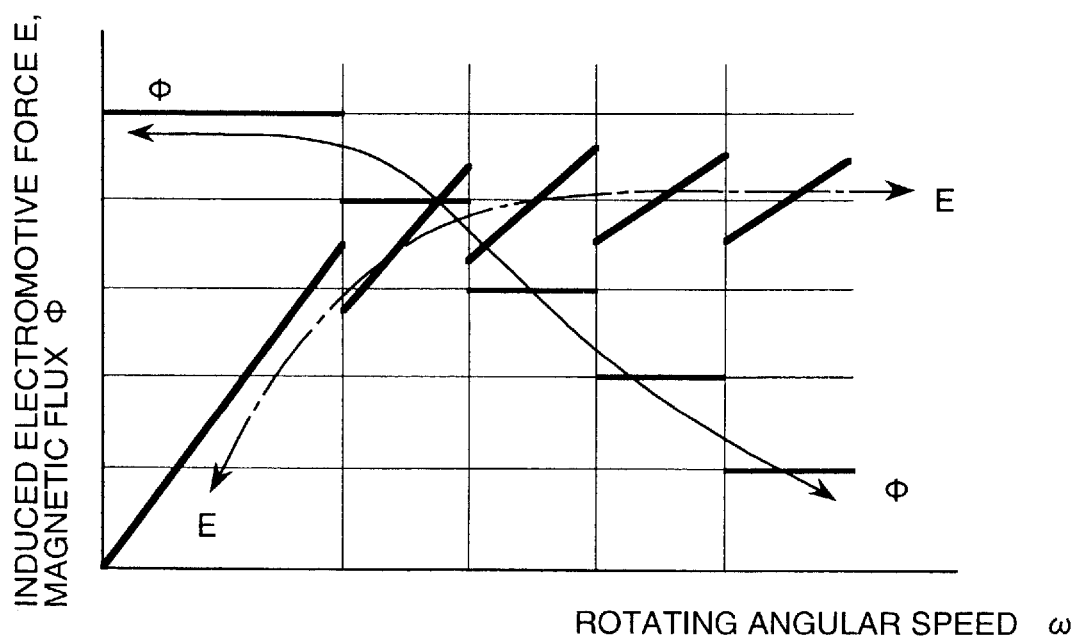

FIGS. 6(a) and 6(b) show the characteristics of the effective flux, the induced electromotive force and the terminal voltage versus the angular rotating speed of the permanent magnet synchronous motor.

The induced electromotive force E is determined by a constant magnetic flux $\Phi$ generated by the permanent magnets arranged in the rotor and an angular rotating speed $\omega$ of the electric motor. That is, as shown in FIG. 6(a), if the constant magnetic flux $\Phi 1$ is constant, the induced electromotive force E1 is proportionally increased as the angular rotating speed $\omega$ (rotating speed) is increased. However, since there is a limitation in the output voltage of the inverter due to the terminal voltage of the power supply and the capacity of the inverter, there is also a limitation in the induced electromotive force generated by the electric motor under a normal operating condition. Therefore, in the permanent magnet synchronous motor, it is necessary in a range above a rotating speed to perform what is called the field weakening control in order to reduce the magnetic flux generated by the permanent magnets.

Since the induced electromotive force is increased in proportion to the angular rotating speed, the current of the field weakening control must be increased. Therefore, a large current needs to be conducted to the coil of primary conductor, and consequently the heat generated in the coil is increased, which may result reducing of the efficiency as a motor in a high rotating speed range and demagnetization of the permanent magnets due to heat generation exceeding the cooling capacity.

For example, as shown in FIG. 6(a), when the magnetic flux $\Phi 1$ generated by the permanent magnets arranged in the rotor is changed to the magnetic flux $\Phi 2$ at a point of the angular rotating speed $\omega 1$ (rotating speed), the induced electromotive force E1 of the motor is changed to the induced electromotive force E2. By this characteristic, the maximum value of the induced electromotive force can be limited.

Similarly, FIG. 6(b) is a schematic graph showing that when the magnetic flux $\Phi$ is changed little by little corresponding to the angular rotating speed $\omega$ (rotating speed), the induced electromotive force E can be maintained constant.

In an embodiment of a means for obtaining the characteristics shown in FIG. 6, the first field magnet of a motor is fixed to a shaft, and the second field magnet is separated from the shaft. The shaft and the second field magnet have screw functions to be connected to each other by forming a bolt screw portion in the shaft and a nut portion inside the second field magnet. Further, a stopper is provided at a position apart from a side surface of the second field magnet, and a servo mechanism capable of moving the stopper in parallel to the shaft according to a rotating speed is provided.

Figure 7:
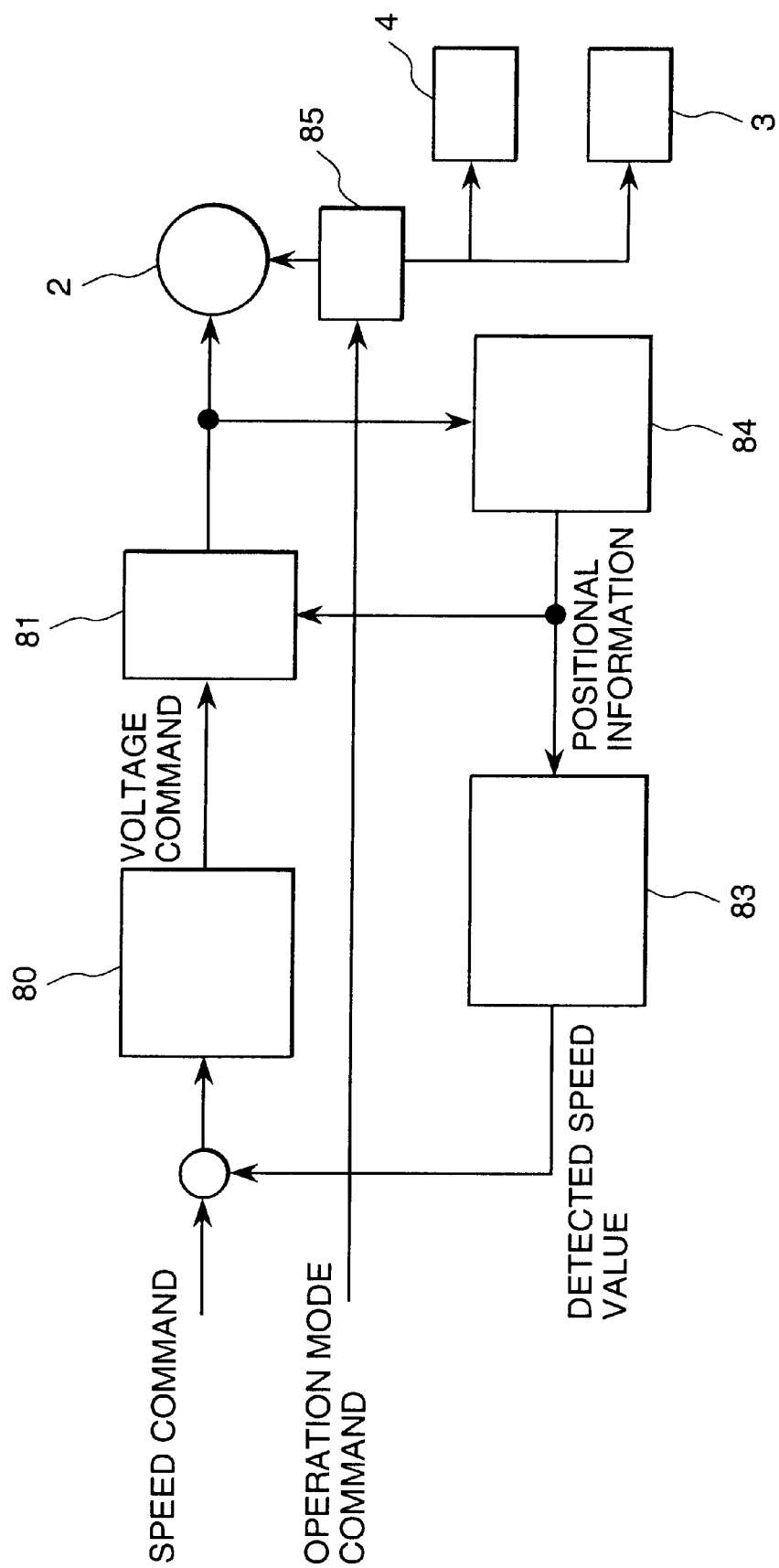
FIG. 7 is a control block diagram of the motor in FIGS. 1(a) and 1(b).

FIG. 7 is a block diagram of a control circuit of the motor for driving the compressor.

An example of the control methods will be described below, based on the 120 degree current conduction control and the induced-voltage type magnetic pole position detection.

(1) A speed control circuit 80: calculating a voltage command value to be applied to the motor 2 using a speed command from the in-room heat exchanger (in-room machine) and a detected speed value from a speed calculating circuit 83.

(2) A driving circuit 81: driving an inverter (switching elements) according to the voltage command value (PWM control).

(3) The speed control circuit 83: calculating a speed of the motor using positional information.

(4) A position detecting circuit 84: detecting of pole positions of the motor 2 using an induced electromotive force and outputting the positional information every an electric angle of 60 degrees. (3-phase 120 degree signal)

(5) A switching circuit 85: outputting a drive signal for switching the expansion valve 4, the four-way valve 3 and the motor 2 according to an operation mode command from the in-room heat exchanger (in-room machine).

Therein, the position detecting circuit 84 may detect the magnetic pole positions using a hole sensor, an encoder, (a current sensor in a case of 180 degrees) or the like instead of the induced electromotive force. Although the out-room heat exchanger controls an out-room fan, the related description is omitted here.

Although the embodiment of FIG. 7 comprises a position-and-speed sensor of the motor 2 and a current sensor of the motor, a control circuit of a sensor-less structure for driving the motor 2 without part of these sensors may be applicable.

Further, since in the permanent magnet synchronous motor of the present invention, the pole centers of equal-polarity of the first and the second rotors are brought in phase or out of phase corresponding to the operating condition, the permanent magnet synchronous motor of the present invention has a function of correcting a lead angle of current supply by a controller for controlling the inverter corresponding to a positional shift angle of the composite magnetic pole of the first field magnet and the second field magnet.

An embodiment of correcting the lead angle of current supply will be described below.

When the motor is operated by fixing the first field magnet to a shaft, by separating the second field magnet from the shaft, and by forming a bolt screw portion in the shaft and a nut portion inside the second field magnet to add screw functions to be connected to each other to the shaft and the second field magnet, the second filed magnet is moved in the axial direction while being rotated.

Figure 16:
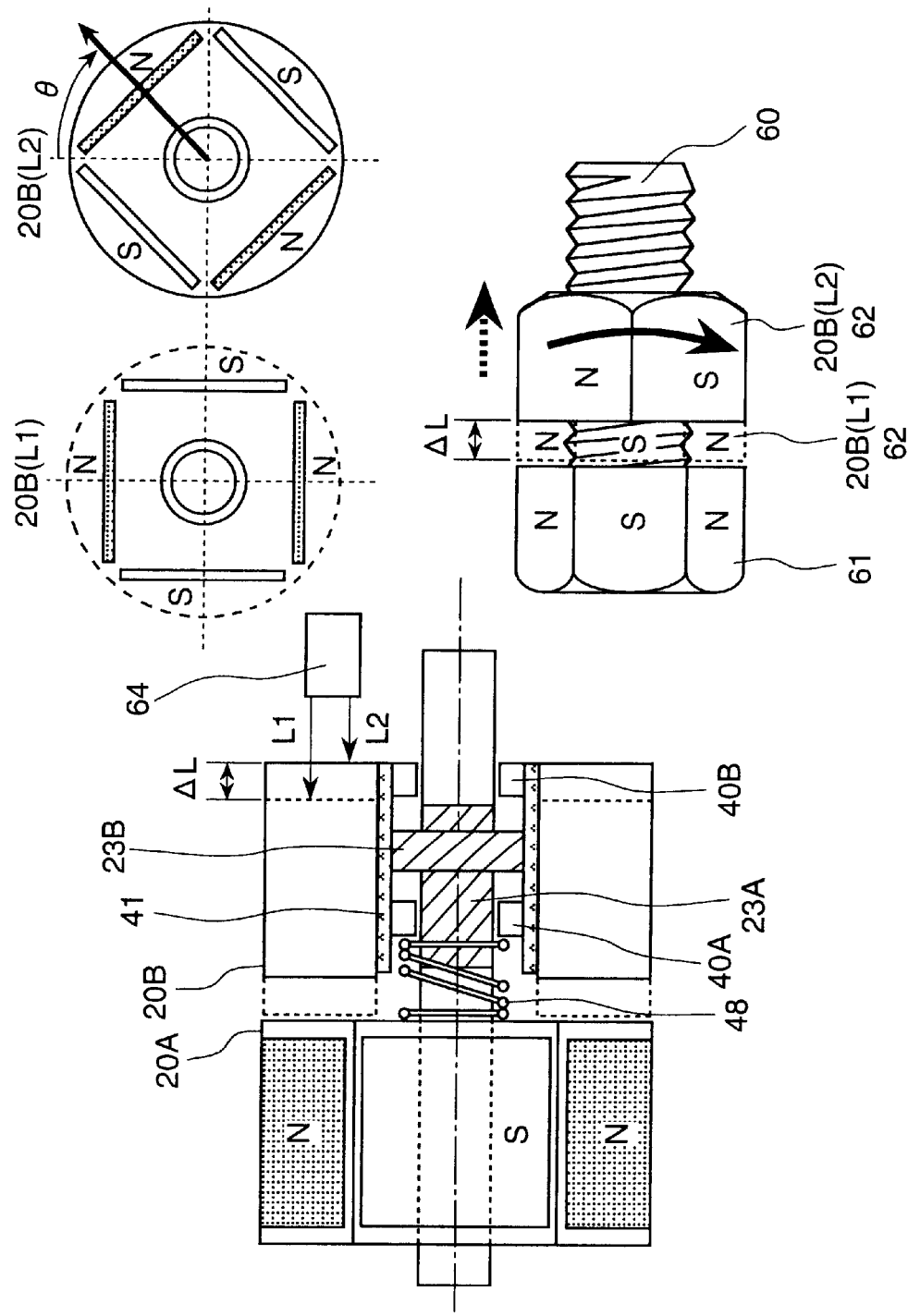
FIG. 16 is a schematic view showing measurement of axial direction displacement in another embodiment of a motor in accordance with the present invention.

FIG. 16 shows the relationship between rotation angle and displacement in the axial direction when the pole centers of equal-polarity of the first rotor and the second rotor are in phase or out of phase corresponding to the operating condition.

Referring to FIG. 16, since there is a proportional relationship between the rotation angle θ and the axial displacement ΔL of the second rotor, the axial displacement ΔL is measured using a displacement meter 64, and fed back to the position detecting circuit (the reference character 84 in FIG. 7) of the control circuit to be used for optimum control to correct the lead angle of current supply as a converted value of the shift angle of the composite magnetic pole position of the first field magnet and the second field magnet.

Figure 8:
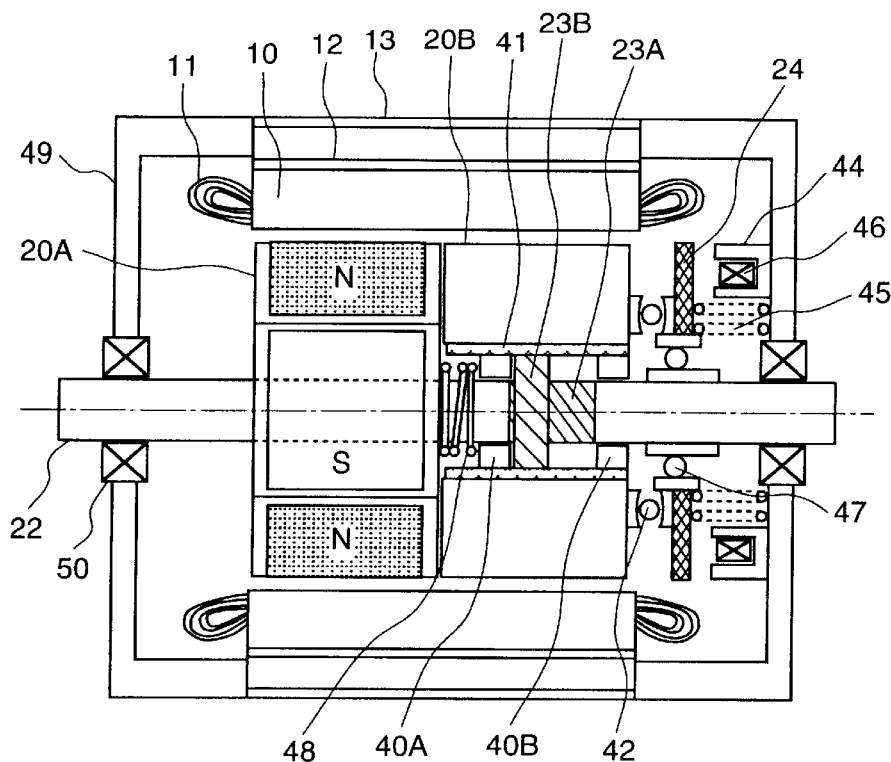
FIG. 8 is a view showing another embodiment of a motor in accordance with the present invention (an actuator in OFF state).

FIG. 8 is a view showing another embodiment of a motor in accordance with the present invention.

The first rotor 20A is fixed to the shaft 22, the second rotor 20B being separated from the shaft 22, the bolt screw portion 23A being formed in part of the shaft, a sleeve 41 being fixed to the inside of the second field magnet, the nut portion 23B being fixed to the inside of the sleeve 41. Thus, the second rotor 20B is rotated with respect to the first rotor 20A while the gap between the first rotor 20A and the second rotor 20B is being widened as if a nut portion were screwed off from a bolt screw portion.

When change in flux linkage occurs between the inside of the second field magnet and the shaft 22 as the second rotor is rotated because there is a small play between the second field magnet and the shaft 22, a trouble such as electrolytic corrosion may occur. Therefore, the sleeve 41 is made of a non-magnetic material having an electric resistivity higher than that of iron. By doing so, the inside of the second field magnet and the shaft 22 are magnetically and electrically insulated by the sleeve 41.

Supporting mechanisms 40A, 40B are arranged inside the sleeve 41 so as to guide rotating motion, reciprocal motion and the composite motion between the second field magnet and the shaft.

The second rotor 20B is connected to the shaft by forming a screw function of the bolt screw portion 23A in part of the shaft, and a movable stopper 24 is arranged at a position apart from a side surface of the second field magnet, and supporting mechanisms 42, 47 are arranged between the stopper 24 and the shaft, and between the stopper and the side surface of the second rotor 20B so as to guide rotating motion, reciprocal motion and the composite motion between the second rotor with respect to the shaft. The supporting mechanism 42 has a function of a thrust bearing, and the supporting mechanism 47 has a function of guiding the rotating motion, the reciprocal motion and the composite motion though it is a radial bearing.

Further, there is an effect that the function of the supporting mechanism 42 is improved as the thrust bearing by arranging a spring 48.

Description will be made below on a magnetic clutch as an example of the servomechanism capable of moving the stopper 24 in parallel to the shaft.

The structure of the magnetic clutch is that a coil 46 is wound around a yoke 44, and a stopper 24 may also serve as a movable core. The yoke 44 and the coil 46 are fixed to a frame 49 of the motor or to a part of the compressor, not shown, and a spring 45 is arranged between the yoke 44 and the stopper 24 so as to have a function of a reset device at braking excitation. A bearing 50 is arranged between the frame 49 and the shaft 22 to support the shaft 22.

Figure 9:
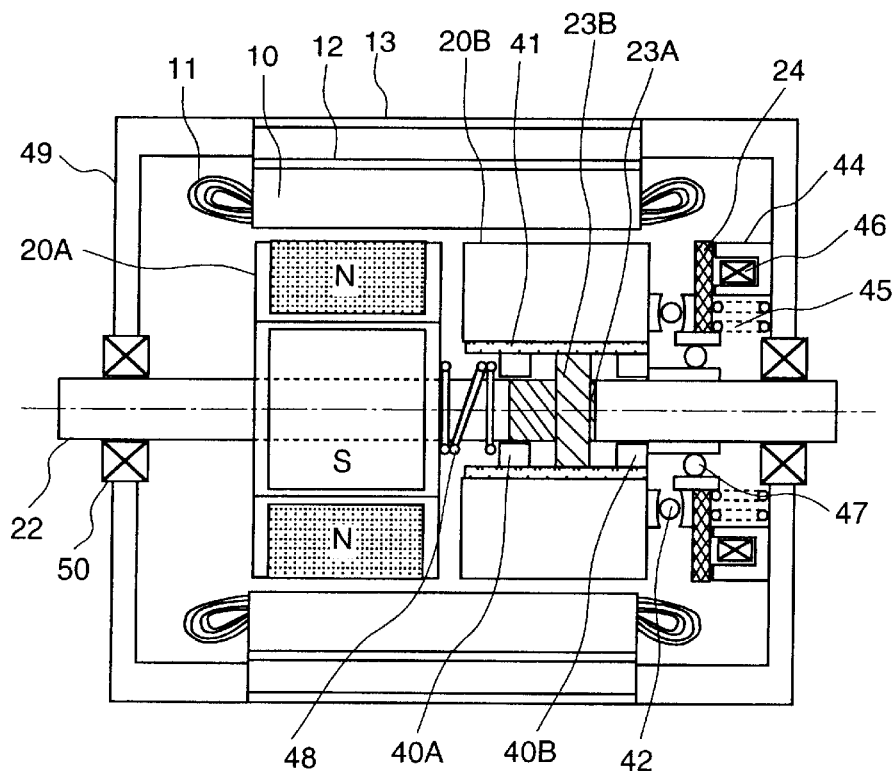
FIG. 9 is a view showing another embodiment of a motor in accordance with the present invention (an actuator in ON state).

FIG. 8 shows the coil 46 under a non-excited state, and FIG. 9 shows the coil 46 under an excited state.

The yoke 44 becomes a strong magnet by exciting the coil 46 to attract the stopper 24 also having the function as the movable core.

When the stopper 24 is attracted by exciting the coil 46, burden of conducting current to the coil 46 can be reduced by adding torque to the second rotor 20B so as to be rotated with respect to the first rotor 20A while the gap between the first rotor 20A and the second rotor 20B is being widened as if a nut portion were screwed off from a bolt screw portion.

The magnetic clutch shown here is an example of a servo mechanism capable of moving the stopper 24 in parallel to the shaft, positioning of the stopper can be more accurately performed by employing a hydraulic actuator, a linear driving device using a rotor and a ball screw, a linear motor or the like.

Figure 10:
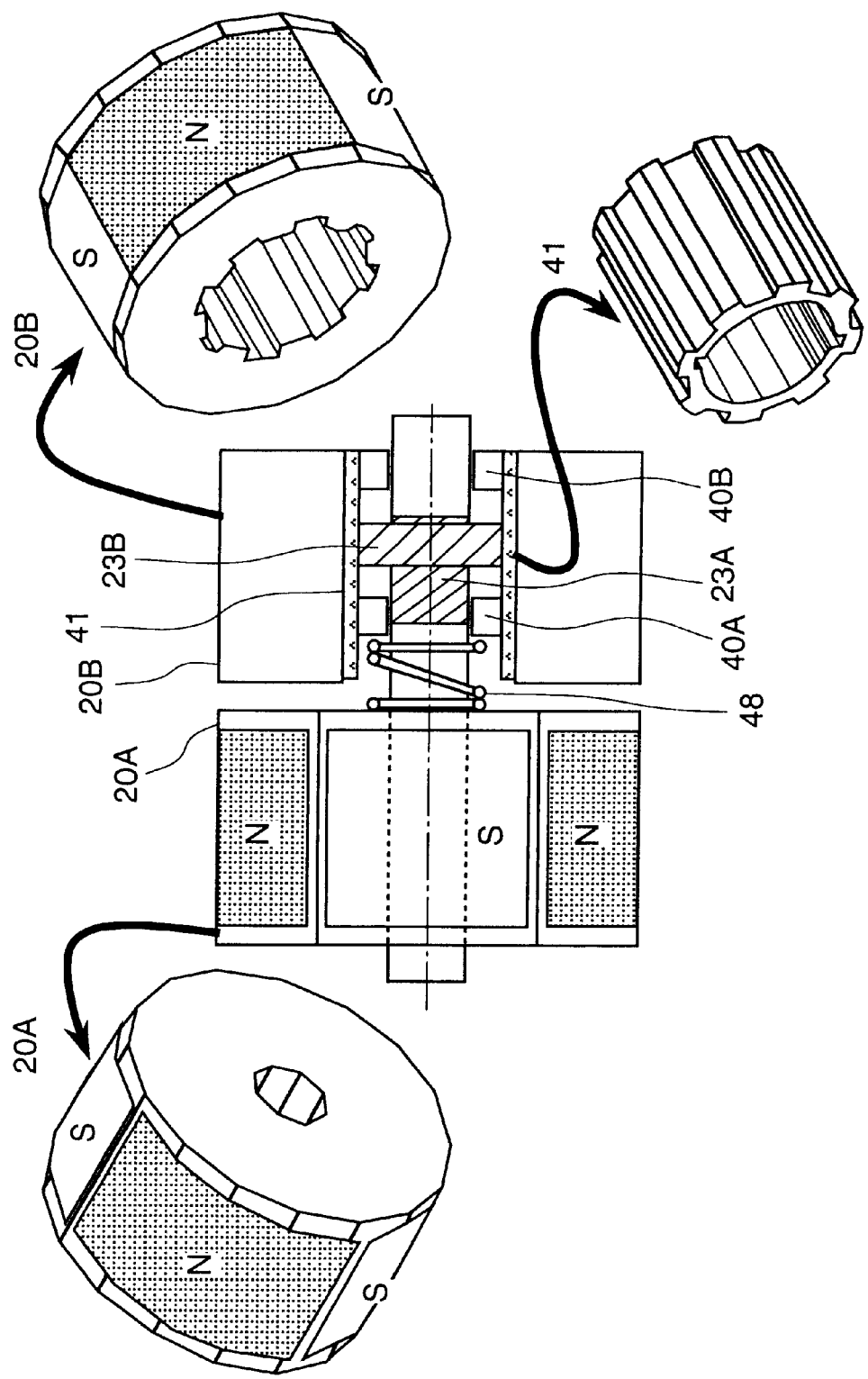
FIG. 10 is a view showing the inside of the rotor of another embodiment of a motor in accordance with the present invention.

FIG. 10 shows an example of the sleeve 41 to be fixed to the inside of the second rotor 20B.

As one of methods of fixing the second rotor and the shaft, the second rotor 20B and the sleeve 41 are fixed by forming projected and depressed portions on the contact surfaces of the two parts. Difference in the structure of the inside portions between the first rotor 20A fixed to the shaft 22 and the second rotor 20B separated from the shaft 22 is shown in FIG. 10.

Figure 11:
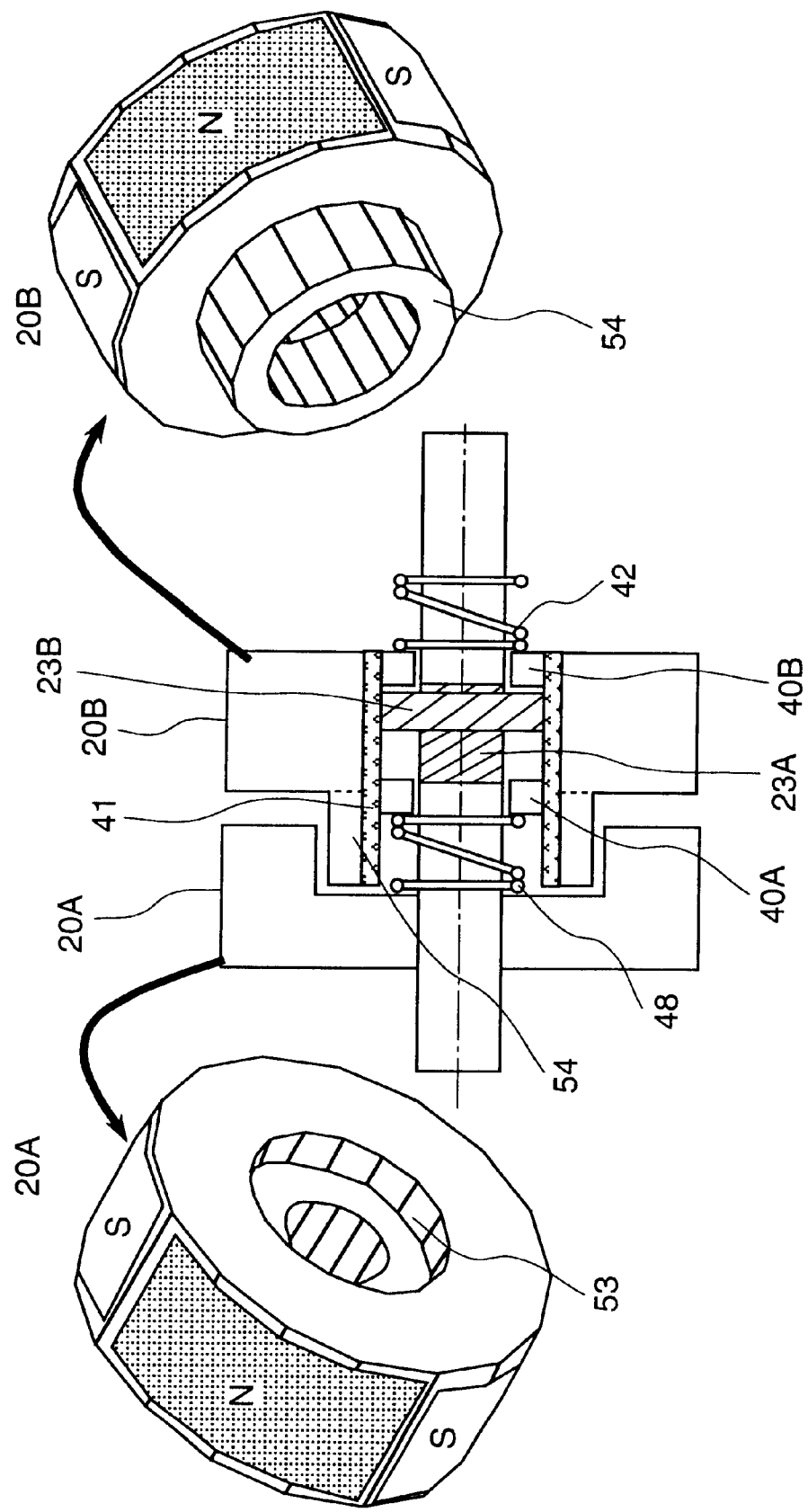
FIG. 11 is a view showing the inside of a rotor of another embodiment of a motor in accordance with the present invention.

FIG. 11 shows another embodiment of the present invention.

A depressed portion 53 is formed on a side surface of the first field magnet where the first field magnet and the second field magnet are in contact with each other, and a projected portion 54 also serving as the function of the sleeve is formed in the second field magnet. The projected portion 54 and the sleeve 41 may be formed in a unit. By doing so, a sufficient space for the sleeve 41 can be secured. Therefore, this is one of methods of obtaining a motor having the second rotor of a thin axial thickness by effectively arranging the spring 48, the supporting mechanisms 40A, 40B and the nut portion 23B.

Figure 12:
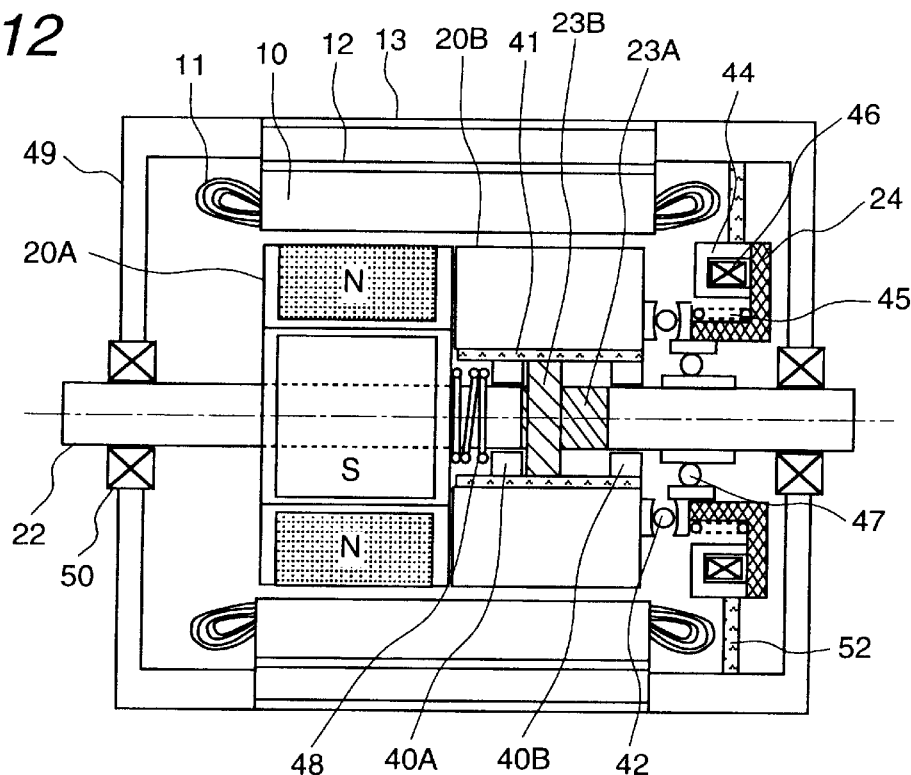
FIG. 12 is a view showing another embodiment of a motor in accordance with the present invention (an actuator in ON state).

FIG. 12 shows another embodiment of the present invention.

The basic components shown in FIG. 12 are the same as those of FIG. 8, but a part corresponding to the magnetic clutch is changed. FIG. 12 shows the coil 46 under the excited condition, and the yoke 44 is detached from the stopper 24 by the spring 45 at cutting off the excitation. Further, the embodiment has a characteristic that a thrust force is applied to the second rotor 20B by the screw function due to an interaction between the bolt screw portion 23A on which torque is applied and the nut portion 23B. Therefore, when the excitation of the coil 46 is cut off, the stopper 24 is detached from the yoke 44 by adding the thrust force to push out the stopper 24 due to the interaction between the screw and the torque. The yoke 44 is fixed to the frame 49 through an arm 52, or to a part of the compressor, not shown.

Similarly to FIGS. 8 and 9, the magnetic clutch shown in FIG. 12 is an example of a servo mechanism capable of moving the stopper 24 in parallel to the shaft, positioning of the stopper can be more accurately performed by employing a hydraulic actuator, a linear driving device using a rotor and a ball screw, a linear motor or the like.

Figure 13:
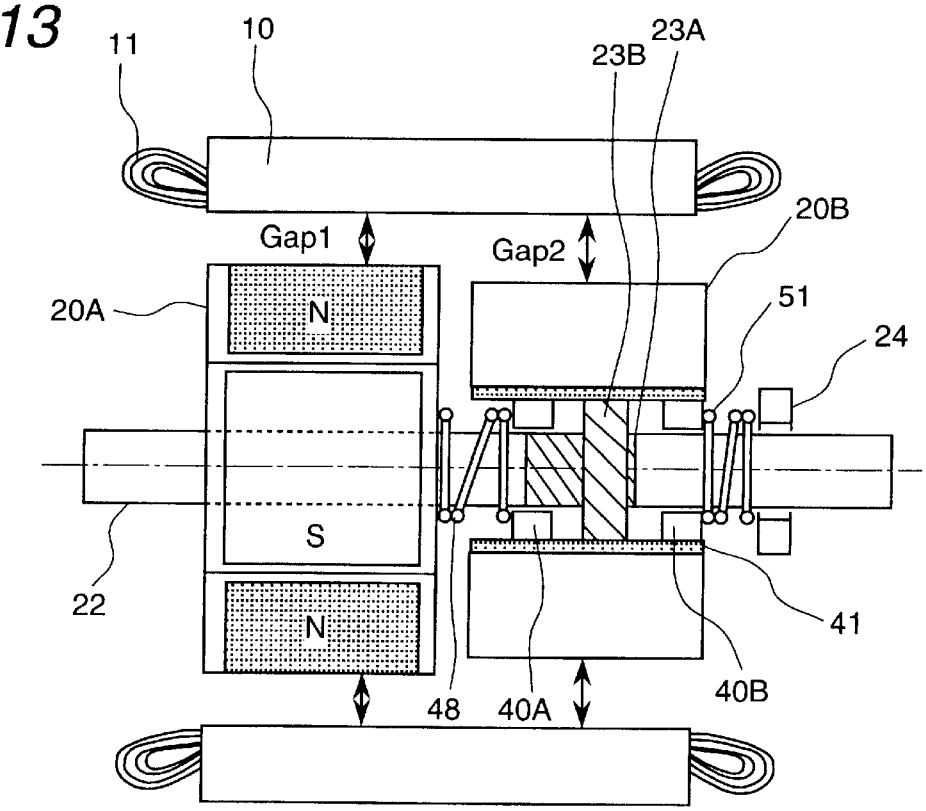
FIG. 13 is a schematic view showing a rotor of another embodiment of a motor in accordance with the present invention (adding gap difference).

FIG. 13 shows another embodiment of the present invention.

The motor in accordance with the present invention is characterized by that the first rotor 20A is firmly fixed to the shaft 22, but the second rotor 20B has freedom to the shaft. Therefore, there is a small play in the mechanical dimension between the second rotor 20B and the shaft 22, and accordingly the second rotor 20B may become eccentric when large torque or a centrifugal force is applied to the second rotor 20B. The air gap Gap 2 between the second rotor 20B having the second field magnet and the stator is made larger than the air gap Gap 1 between the first rotor 20A having the first field magnet and the stator. By doing so, the mechanical contact between the second rotor 20B and the stator caused by decentering can be prevented.

A plurality of springs 48 and 51 are arranged between the stopper 24 and the second rotor 20B and between the first rotor 20A and the second rotor 20B, respectively. Thereby, there is an effect in that rapid fluctuation in the second rotor 20B can be suppressed, and motion of the second rotor 20B by the torque direction can be assisted.

Of course, the structural elements shown by the figures can be combined by various methods, or can be added or eliminated depending on the purpose of use.

Figure 14:
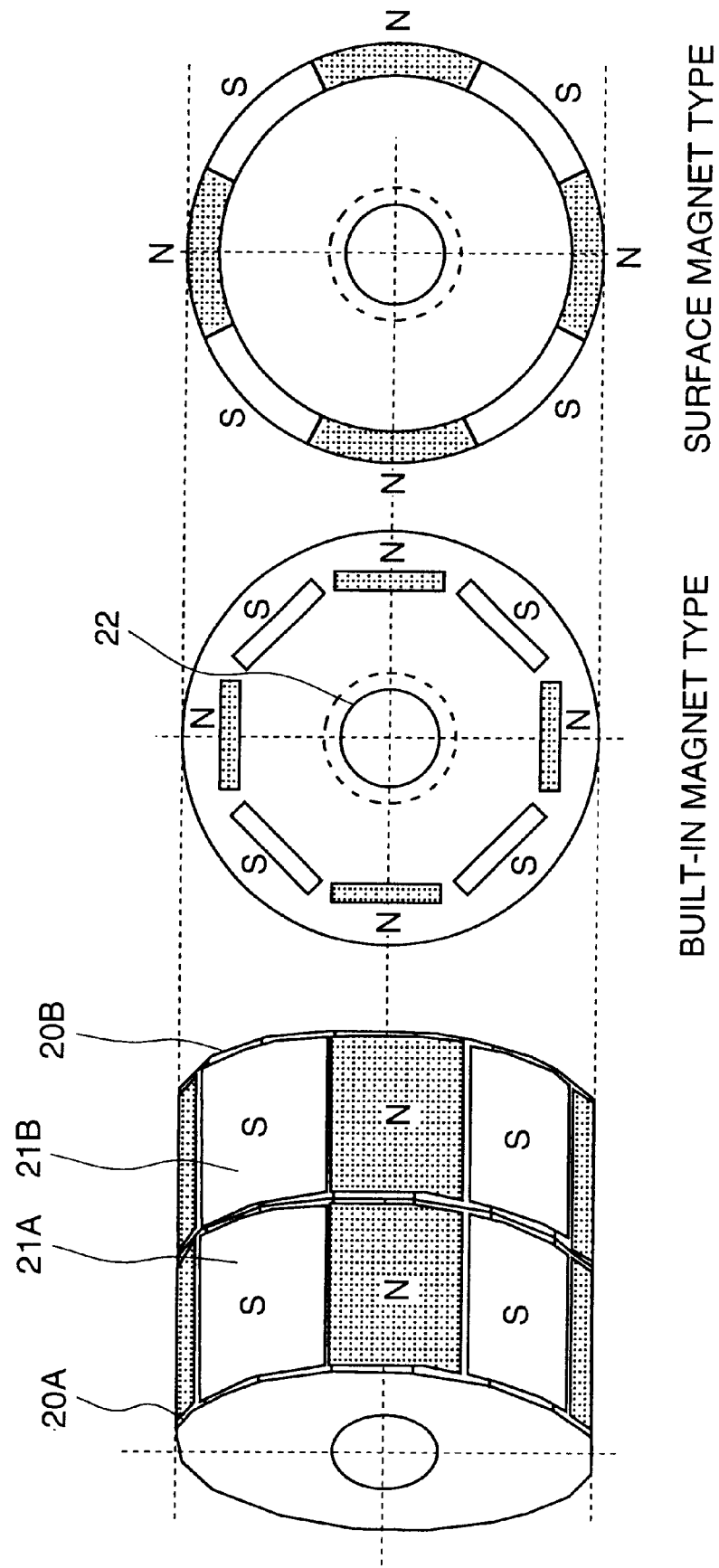
FIG. 14 is a schematic view showing a rotor of another embodiment of a motor in accordance with the present invention (a case where the present invention is applied to a 8-pole motor).

Although the above explanation of the present invention has been made on the four-pole motor, there is no need to say that the present invention can be applied to a two-pole motor or a six-pole motor. As an example, FIG. 14 is a schematic view showing a rotor of a permanent magnet synchronous motor in which the present invention is applied to an eight-pole motor. Further, the present invention can be applied to any type of rotor, an embedded magnet type or a surface magnet type.

Figure 15:
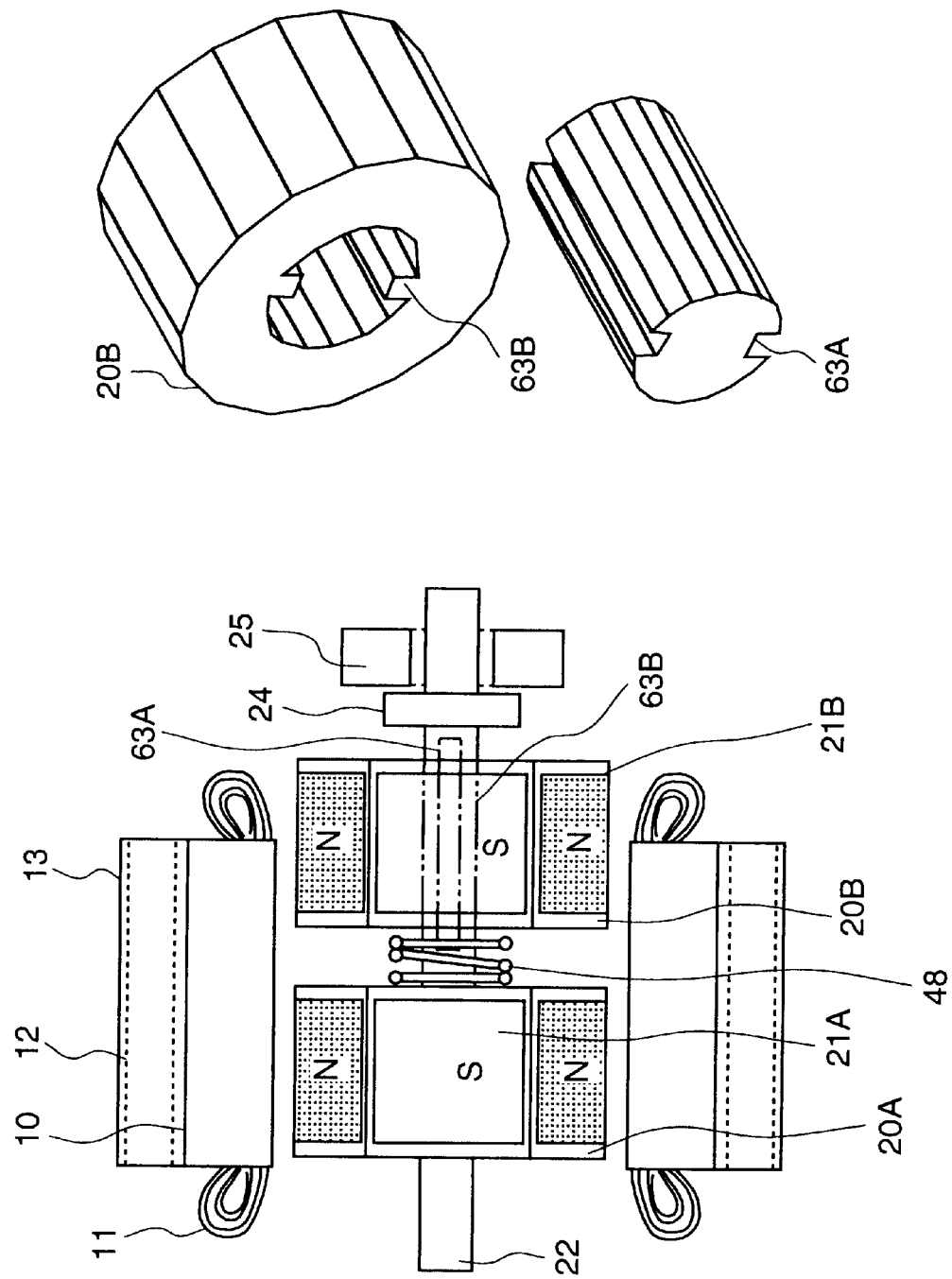
FIG. 15 is a schematic view showing a rotor of another embodiment of a motor in accordance with the present invention (movable in the axial direction).

FIG. 15 shows an idea that the first and the second field magnets are relatively-moved in the axial direction.

Referring to FIG. 15, a groove 63A is formed in part of the shaft 22, and a projected portion 63B is formed the inner side of the second rotor 20B, and thus, the first and the second field magnets can be relatively moved in the axial direction by combining the shaft 22 and the second rotor 20B. The motion in the axial direction is performed using a stopper driving actuator 25 of a servomechanism.

Since the permanent magnet synchronous motor in accordance with the present invention is constructed in that the rotors divided into the first field magnet and the second field magnet are arranged on the single shaft, and the pole centers of the first and the second field magnets are varied depending on the direction of torque, there is the effect that the effective magnetic flux by the permanent magnets opposite to the stator magnetic poles can be varied.

Particularly, weakening magnetic filed control of the motor for the compressor of the air conditioner can be easily performed, and accordingly there is the effect of the wide range variable speed control.

What is claimed is:

1. An air conditioner, comprising a refrigerating cycle composed of at least a compressor; an electric motor usable as a power source of said compressor; an electric driving circuit for driving said electric motor; an in-room heat exchanger; an electrically operated expansion valve; and an out-room heat exchanger, with a flow rate of a refrigerant circulating in said refrigerating cycle being controlled by changing rotational speed of said electric motor and an opening degree of said electrically operated expansion valve, wherein said electric motor comprises:
   a stator having a primary winding and a rotor having a field magnet, said field magnet comprising a first field magnet having different polarity magnetic poles sequentially arranged in a rotating direction and a second field magnet having different polarity magnetic poles sequentially arranged in a rotating direction, said second field magnet being capable of rotating relative to said first field magnet, said first and said second field magnets being opposite to magnetic poles of said stator; and
   a mechanism for changing a phase of a composite magnetic pole of said first and said second field magnets with respect to the magnetic pole of said first field magnet depending on a direction of torque, said mechanism for changing depending on a direction of torque comprising means for making magnetic pole centers of equal-polarity of said first and said second field magnets in phase by a direction of torque generated in said rotor and by balance of magnetic action forces between said first and said second field magnets; and means for making the magnetic pole centers of said first and said second field magnets out of phase when the direction of torque generated in the rotor is reversed.

2. An air conditioner according to claim 1, wherein said electric motor comprises means for making said first and said second field magnets in phase at an initial position; and means for making the magnetic pole centers of said first and said second field magnets out of phase with each other, and said mechanism for changing the magnetic pole centers depending on change in the direction of torque is constructed so that said first field magnet is fixed to a shaft, and said second field magnet is separated from said shaft, and the magnetic pole center of said first field magnet and the magnetic pole center of said second field magnet may be made to be out of phase by forming said shaft and said second field magnet relatively movable from each other within an angle corresponding one pole of the magnetic pole.

3. An air conditioner according to claim 1, which uses an electric motor comprising:

said mechanism for changing the magnetic pole centers depending on change in the direction of torque, said mechanism being constructed so that said first field magnet is fixed to a shaft, and said second field magnet is separated from said shaft, and said shaft and said second field magnet have screw functions to be connected to each other by forming a bolt screw portion in said shaft and a nut portion inside said second field magnet;

a stopper at a position apart from a side surface of said second field magnet; and a servomechanism capable of moving said stopper in parallel to said shaft according to a rotating speed of said motor.

4. An electric motor according to claim 1, wherein a lead angle of current supply by a controller for controlling said controller is corrected according to a positional shift of a composite magnetic pole of said first field magnet and said second field magnet.

5. An electric motor according to claim 1, wherein said first field magnet is fixed to a shaft, said second field magnet being separated from said shaft, said shaft and said second field magnet having screw functions to be connected to each other by forming a bolt screw portion in said shaft and a nut portion inside said second field magnet, a displacement in an axial direction of said second field magnet being detected, a lead angle of current supply by a controller for controlling said inverter being corrected corresponding to a positional shift angle of a composite magnetic pole of said first field magnet and said second field magnet.

6. An electric motor according to claim 1, wherein said first field magnet is fixed to a shaft, said second field magnet being separated from said shaft, a plurality of supporting mechanisms capable of guiding rotational motion and reciprocal motion and the composite motion of said second field magnet being arranged between said second field magnet and said shaft.

7. An electric motor according to claim 1, wherein said first field magnet is fixed to a shaft, said second field magnet being separated from said shaft, a plurality of springs being arranged before and after said second field magnet to guide rotational motion and reciprocal motion and the composite motion of said second field magnet.

8. A rotary electric machine according to claim 1, wherein said first field magnet is fixed to a shaft, said second field magnet being separated from said shaft, a sleeve being inserted between the inside of said second filed magnet and said shaft to fix said second field magnet to said sleeve.

9. A rotary electric machine according to claim 8, wherein said sleeve is made of a non-magnetic material having an electric resistivity higher than the resistivity of iron.

10. An electric motor according to claim 1, wherein said first field magnet is fixed to a shaft, said second field magnet being separated from said shaft, a depressing portion being formed on a side surface of said first field magnet where said first field magnet and said second field magnet are in contact with each other, a projecting portion also serving as a function of said sleeve being formed in said second field magnet.

11. An electric motor according to claim 1, wherein said first field magnet is fixed to a shaft, said second field magnet being separated from said shaft, a stopper being arranged at a position apart from a side surface of said second field magnet, said stopper having a supporting mechanism for guiding rotational motion and reciprocal motion and the composite motion to said second field magnet and said shaft.

12. An electric motor according to claim 1, wherein said first field magnet is fixed to a shaft, said second field magnet being separated from said shaft, an air gap between said rotor having said first field magnet and said stator being larger than an air gap between the rotor having said second field magnet and said stator.

13. An electric motor according to claim 1, wherein said first and said second field magnets are opposite to the magnetic poles of said stator, and said first and said second field magnets are relatively movable in the axial direction.

14. An air conditioner according to claim 1, wherein said rotary electric machine is operated by making positions of the magnetic pole centers of said first field magnet and said second field magnet in phase during normal operation (cooling operation, heating operation: operation requiring high torque), and by making the positions of the magnetic pole centers of said first field magnet and said second field magnet out of phase during high speed low load operation (defrosting operation: operation not requiring high torque).

\* \* \* \* \*